A. L. CAMPBELL.
BRAKE MECHANISM FOR MOTOR CARS.
APPLICATION FILED AUG. 22, 1916.

1,222,929.

Patented Apr. 17, 1917.
5 SHEETS—SHEET 1.

INVENTOR.
BY
ATTORNEYS.

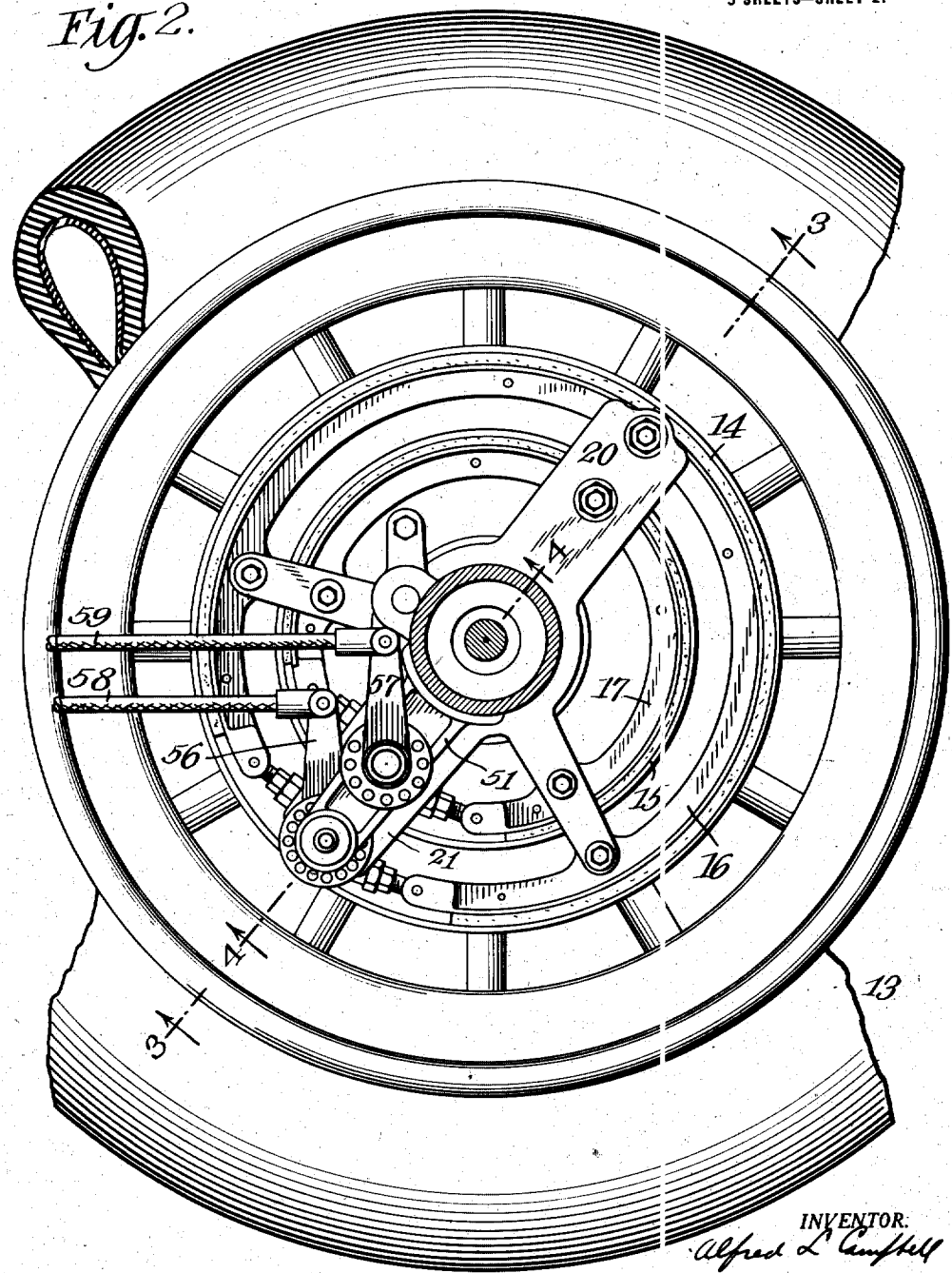

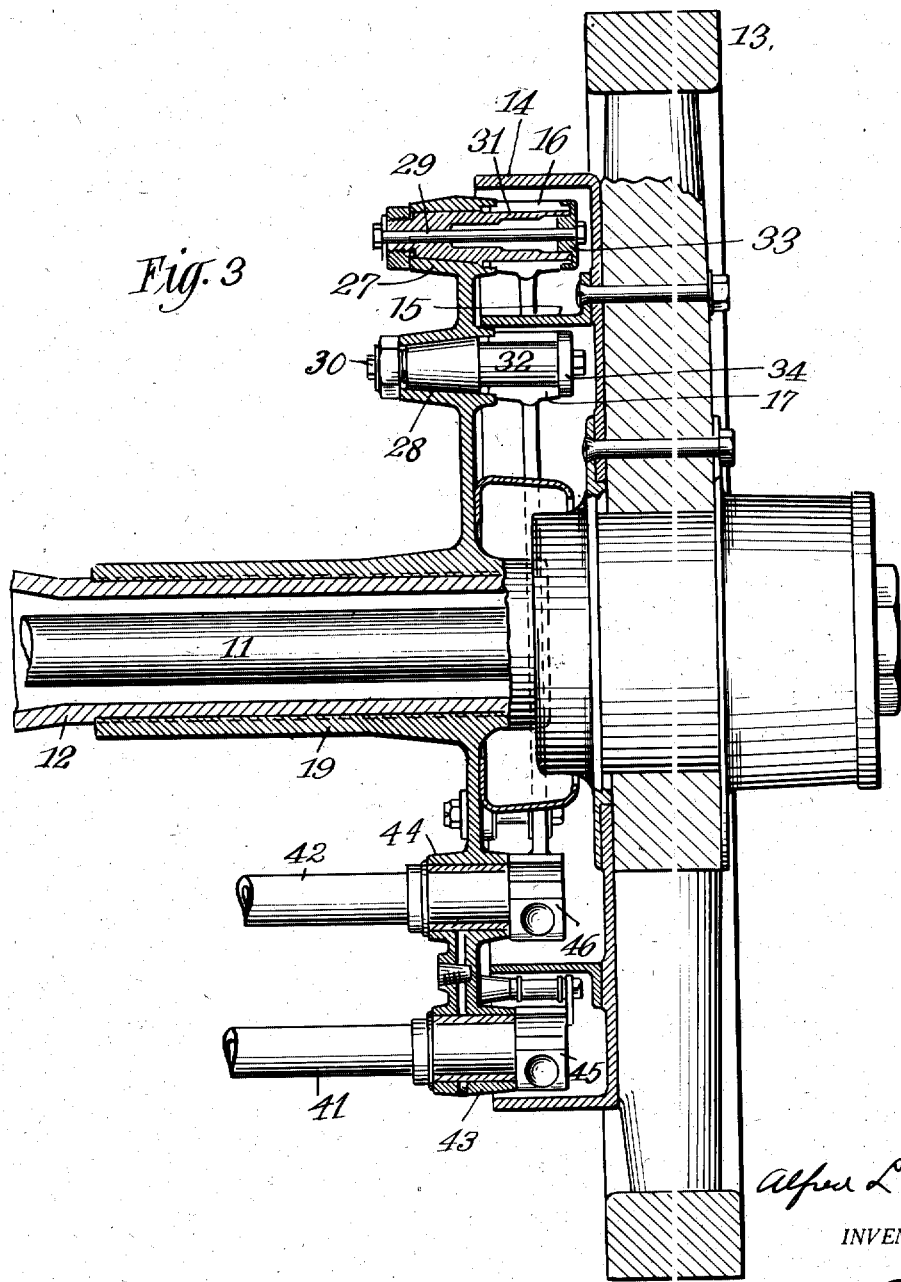

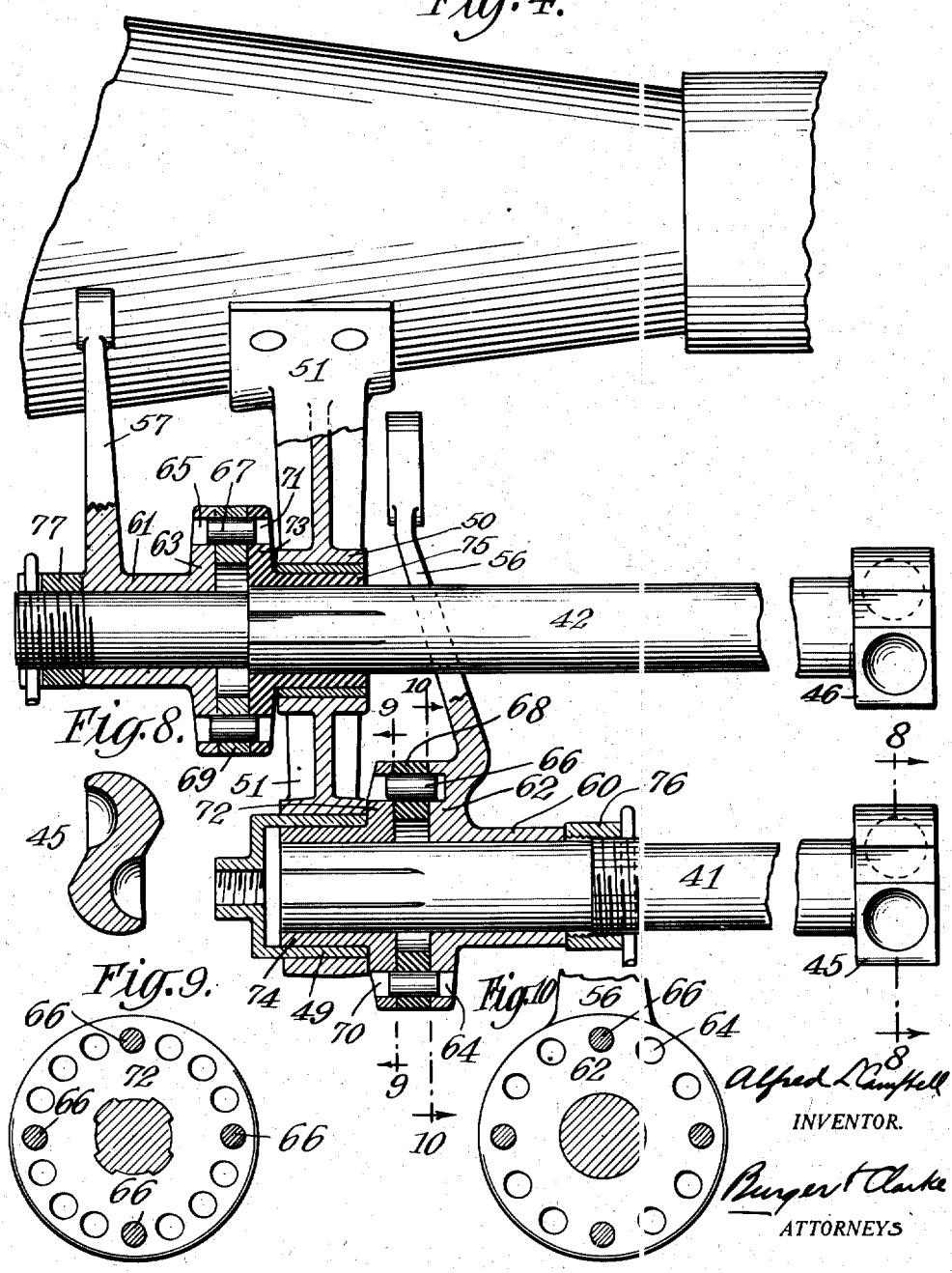

A. L. CAMPBELL.
BRAKE MECHANISM FOR MOTOR CARS.
APPLICATION FILED AUG. 22, 1916.
1,222,929.
Patented Apr. 17, 1917.
5 SHEETS—SHEET 5.
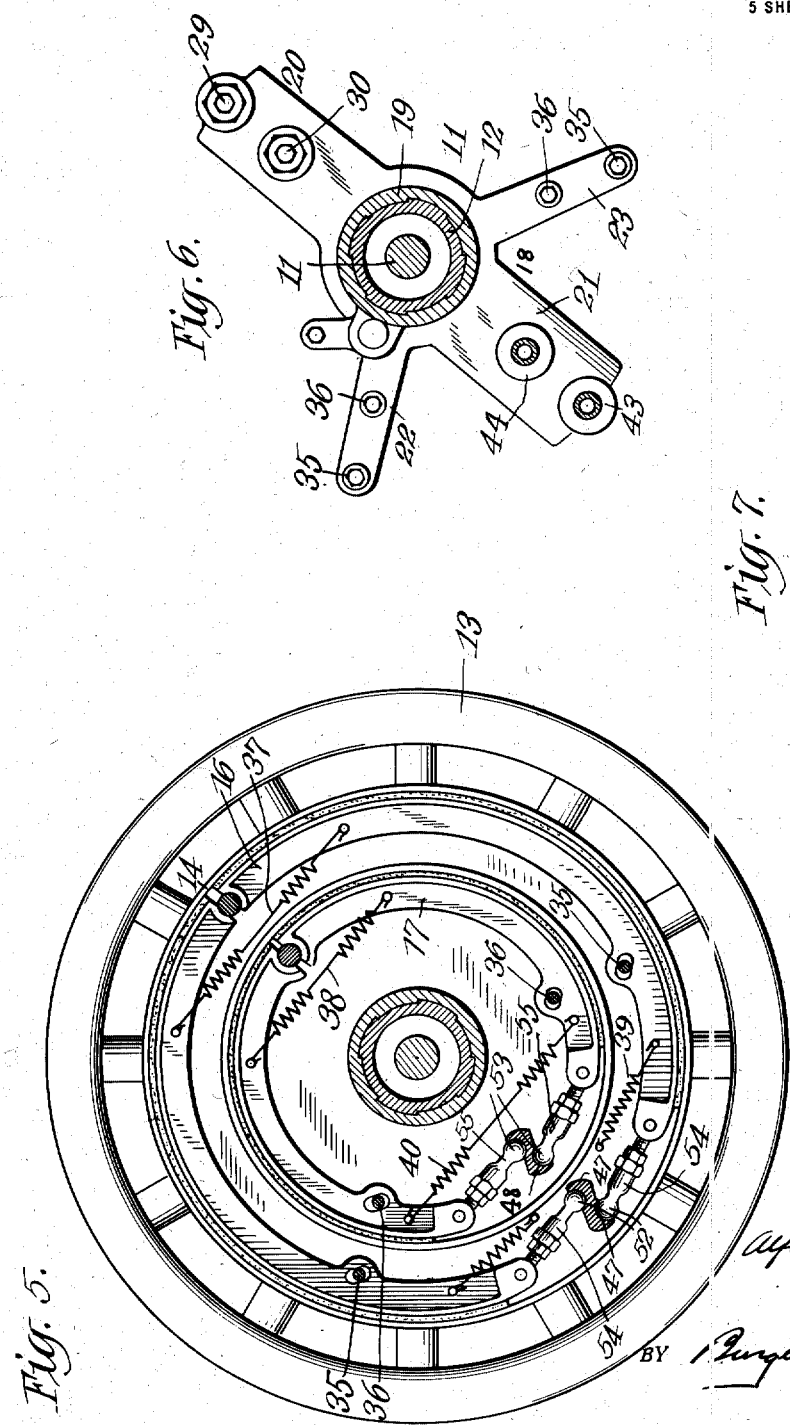
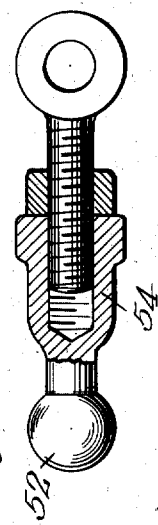
Alfred L Campbell
INVENTOR.
BY Burger & Clarke
ATTORNEYS.

UNITED STATES PATENT OFFICE.

ALFRED L. CAMPBELL, OF ELMHURST, NEW YORK, ASSIGNOR TO BREWSTER & CO., A CORPORATION OF NEW YORK.

BRAKE MECHANISM FOR MOTOR-CARS.

1,222,929.  Specification of Letters Patent.  Patented Apr. 17, 1917.

Application filed August 22, 1916. Serial No. 116,299.

*To all whom it may concern:*

Be it known that I, ALFRED L. CAMPBELL, a citizen of the United States, residing at 31 Twenty-fifth street, Elmhurst, in the county of Queens and State of New York, have invented a new and useful Improvement in Brake Mechanisms for Motor-Cars, of which the following is a specification.

My invention relates generally to improvements in the brake mechanism of motor cars and more specifically to improvements in the means for mounting the brakes on the wheels, for operating the brakes, and for adjusting the brakes.

In order that my invention may be fully understood, I shall first describe in detail the mode in which I at present prefer to carry my invention into practice, and then point out the various features of the invention and define their scope in the claims.

Reference is to be had to the accompanying drawings forming part of this specification in which like parts are designated by similar numbers in all the figures.

Fig. 2 is a sectional side view of the same on the line 2—2, Fig. 1.

Fig. 3 is a cross-sectional view on the line 3—3, Fig. 2.

Fig. 4 is an enlarged cross-sectional view on the line 4—4, Fig. 2.

Fig. 5 is a sectional side view on the line 5—5, Fig. 1.

Fig. 6 is a detail sectional side view showing the wheel spider on which the brake shoes are mounted.

Fig. 7 is an enlarged sectional view of one of the brake shoe adjusting devices.

Fig. 8 is an enlarged sectional view of one of the brake shoe expanding levers.

Fig. 9 is a detail sectional side view on the line 9—9, Fig. 4.

Fig. 10 is a detail sectional side view on the line 10—10, Fig. 4.

Figure 1:
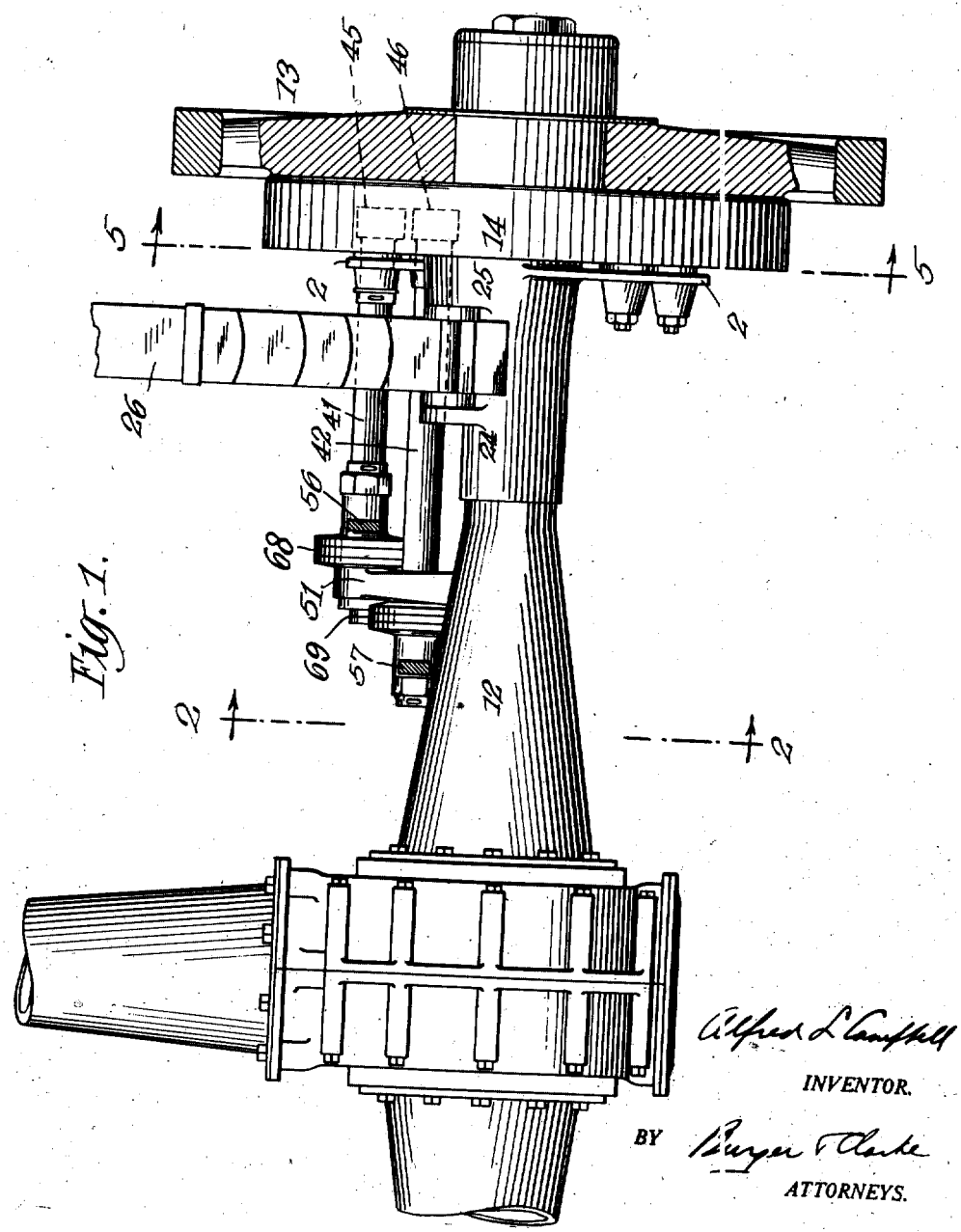
Figure 1 is a plan view, partly sectional, showing brake mechanism embodying my invention applied to the rear axle housing and wheel of a motor.

In the particular embodiment of my invention shown in the drawings, 11 designates the rear axle of a motor car, 12 the rear axle and differential housing, 13 one of the rear wheels, and 14 and 15 concentric brake drums fixed on the wheel 13, and 16 and 17 the outer and inner lined brake shoes respectively, which in this example of my invention are both interior shoes expanding against the inside of the drums 14 and 15 respectively.

As a mounting for the brake shoes 16 and 17 and their operating devices, I provide a strong spider 18 (shown in detail in Fig. 6), formed integrally with a hub 19, which is fitted over and keyed to the rear axle housing 12, inside the wheel 13, with diametrically opposite radial arms 20 and 21, with arms 22 and 23 radially on opposite sides of the arm 21, and with lugs 24 and 25 to which the, in this case, cantaliver spring 26 is secured.

On the spider arm 20 are integrally formed tapering socket bearings 27 and 28 in which are secured replaceably by bolts 29 and 30, the correspondingly tapered heads of pivots 31 and 32 for the pivot bearings of the semi-circular outer and inner brake shoes 16 and 17 respectively, the opposing ends of the socket bearings 27 and 28, and caps 33 and 34 on the inner ends of the pivot bearings 31 and 32, being undercut or flanged, as shown, to retain the correspondingly cut or flanged edges of the shoe pivot bearings.

In the arms 22 and 23 of the brake spider 18 are fixed guide pins 35 and 36, on which play corresponding slots in the brake shoes 16 and 17 respectively, as the brake shoes expand and contract. The opposite semicircular sections of the brake shoes 16 and 17 are pressed together on their pivot bearings and their actuating bearings hereinafter described, by springs 37 and 38, and 39 and 40, which thus tend to contract the brake shoes and release the brakes.

The spider arm 21 is formed integrally with sleeve bearings 43 and 44, in which are mounted to turn rock shafts 41 and 42 carrying on their outer ends cross-levers 45 and 46, the opposite arms of which are formed with ball sockets 47 and 48 facing the opposing free ends of the brake shoes 16 and 17. The inner ends of the rock shafts 41 and 42 are mounted to turn in bearings 49 and 50 on a bracket 51 fixed to the axle housing 12.

In the ball sockets 47, are fitted to turn universally balls 52, 53, formed on the ends of longitudinally adjustable links 54, 55, the other ends of which are pivotally connected to the ends of the respective brake shoe sections 16, 17, so that when the rock shafts 41, 42, are turned in one direction, the respective brake shoes 16, 17 will be expanded and tightened against the respective brake drums 14, 15, and when the rock shafts 41, 42 are turned in the opposite direction, the brake springs 37, 38 and 39, 40 will contract and release the brake shoes 16, 17, from the respective brake drums 14, 15.

For adjusting the brake shoes 16, 17, with respect to the brake drums 15, 16, the actuating links 54, 55 are each made of telescopic sections threaded together, as shown in detail in Fig. 7, and provided with lock nuts, so that the sections of the links 54, 55, can be adjusted longitudinally and locked in position with respect to each other, and the links thus adjusted to the proper length.

For turning the rock shafts 41, 42, and thus setting or releasing the brakes at will, rock shaft actuating arms 56, 57 are fixed adjustably on the rock shafts as hereinafter described, and connected to the usual brake cables 58, 59, which are in turn connected with the emergency and working brake operating hand and foot levers in the usual way.

To provide for tightening the brake cables or adjusting the brake operating arms 56, 57, with respect to the brake shoe actuating levers 45, 46, the brake operating arms 56, 57, are fixed on sleeves 60, 61, which are fitted on so as to be adjustable around and movable lengthwise on the rock shafts 41, 42 and are held in position thereon when adjusted by locking nuts 76, 77.

The adjustable sleeves 60, 61 are formed with disks 62, 63 formed with a peripheral series of pin holes 64, 65, to receive removably a peripheral series of projecting pins 66, 67, which are fixed in a peripheral series of pin holes formed in collars 68, 69, loosely surrounding the rock shafts 41 and 42. The opposite projecting ends of the pins 66, 67, are fitted to enter removably a peripheral series of pin holes 70, 71, formed in disks 72, 73, fixed on sleeves 74, 75, which surround and are keyed to the rock shafts 41, 42 and turn with said shafts 41, 42, within the fixed bearings 49, 50.

In this example of my invention there are four equi-distant pins 66, 67, in the collars 68, 69, and there are twelve pin holes in each of the adjustable disks 62, 63, and sixteen pin holes in each of the keyed disks 72, 73, the numbers of pin holes twelve and sixteen being multiples of the number four of pins in the collars 68, 69.

With this construction, by loosening the nuts 76, 77, and withdrawing the loose disks 62, 63, and pin-carrying collars 68, 69 axially, the set of four pins 66, 67, can be placed and then locked in any corresponding four pin holes in the pairs of disks 62, 72, and 63, 73, so as to adjust the adjustable disks 62, 63, and brake actuating operating arms 56, 57, in any desired position with respect to the rock shafts 41, 42 and brake operating levers 45, 46, for tightening or loosening the brake cables 58, 59.

It is evident that many of the features of my invention herein described may be used independently of each other and may be greatly varied in construction and arrangement without departing from the spirit and scope of my invention, for a definition of which reference is to be had to the following claims.

I claim as my invention:

1. The combination, with the wheel, the brake drum, the slotted brake shoe sections, the axle and the axle housing, of a spider formed integrally with a sleeve fixed on the axle housing and with opposite arms formed respectively with a bearing for the pivot of the brake shoe sections, and bearing for the actuating lever of the brake shoe, and with a lateral arm and a guide pin carried by said lateral arm, on which plays the slot in the corresponding brake shoe section.

2. The combination, with the wheel, the brake drum, the brake shoe sections, the axle and the axle housing, of a spider arm fixed on said axle housing and formed with an undercut socket bearing, a brake shoe pivot having a head fixed in said socket bearing, an undercut cap fixed on said pivot, and brake shoe sections having their edges cut to enter the undercut socket bearing and cap.

3. The combination, with the brake actuating rock shaft, of a disk fixed thereon with a peripheral series of pin holes, a disk loose thereon formed with a peripheral series of pin holes, a loose collar interposed between the disks and pins fixed in said collar to enter corresponding holes in both disks.

4. The combination, with the brake actuating rock shaft, of a disk fixed thereon formed with a peripheral series of pin holes, a disk loose thereon formed with a series of peripheral holes of a different number from those of the tight disk, a collar interposed between the disks, and pins fixed in the collar, of a number of which the numbers of holes in both disks are different multiples.

ALFRED L. CAMPBELL.